US012590920B2

(12) United States Patent
Mashimo et al.

(10) Patent No.: US 12,590,920 B2
(45) Date of Patent: Mar. 31, 2026

(54) BIOSENSOR

(71) Applicant: ARKRAY, Inc., Kyoto (JP)

(72) Inventors: Taro Mashimo, Kyoto (JP); Shinjiro Sekimoto, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 219 days.

(21) Appl. No.: 18/137,102

(22) Filed: Apr. 20, 2023

(65) Prior Publication Data

US 2023/0341347 A1    Oct. 26, 2023

(30) Foreign Application Priority Data

Apr. 21, 2022    (JP) ................................. 2022-070369
Apr. 11, 2023    (JP) ................................. 2023-064394

(51) Int. Cl.
*G01N 27/327*          (2006.01)
(52) U.S. Cl.
CPC ................................. *G01N 27/3272* (2013.01)
(58) Field of Classification Search
CPC ............. G01N 27/327; G01N 27/3271; G01N 27/3272
See application file for complete search history.

(56) References Cited

U.S. PATENT DOCUMENTS

| | | | |
|---|---|---|---|
| 9,829,459 B2 | 11/2017 | Zhu et al. | |
| 2007/0278097 A1 | 12/2007 | Bhullar et al. | |
| 2009/0178936 A1 | 7/2009 | Zhu | |
| 2012/0122197 A1 | 5/2012 | Jospeh | |
| 2012/0150005 A1 | 6/2012 | Hoss et al. | |
| 2013/0020196 A1 | 1/2013 | Nishiwaki et al. | |
| 2014/0373347 A1 | 12/2014 | Takagi et al. | |
| 2015/0201491 A1 | 7/2015 | Tatsuta | |
| 2016/0017399 A1 | 1/2016 | Cardosi et al. | |
| 2018/0095048 A1* | 4/2018 | Kaneda ................. C12Q 1/006 | |

(Continued)

FOREIGN PATENT DOCUMENTS

| | | |
|---|---|---|
| EP | 2554982 A1 | 2/2013 |
| EP | 4000517 A1 | 5/2022 |
| JP | H6-3317 A | 1/1994 |

(Continued)

OTHER PUBLICATIONS

Extended European Search Report of Application No. 23169187.4, dated Sep. 18, 2023.

(Continued)

*Primary Examiner* — Gurpreet Kaur
(74) *Attorney, Agent, or Firm* — Morgan, Lewis & Bockius LLP

(57)          ABSTRACT

A biosensor that is capable of performing measurement with a high reproducibility is provided in one aspect.
The present disclosure, as one aspect, relates to a biosensor that includes a base material, a conductive part including two or more electrodes provided on a surface of the base material, and a reagent layer provided on at least a part of the conductive part, the reagent layer has a mean thickness of 5 μm to 10 μm and a mean thickness difference, calculated based on the following formula, of −6 μm to +5 μm.

[mean thickness difference]=[mean thickness of peripheral part]−[mean thickness of central part]

16 Claims, 4 Drawing Sheets

Mean thickness difference
(difference between mean thicknesses of the peripheral and central parts in the reagent layer)
(μm)

(56) References Cited

U.S. PATENT DOCUMENTS

2023/0273145  A1*    8/2023   Babic ................. A61B 5/14865
                                                           205/777.5

FOREIGN PATENT DOCUMENTS

| | | |
|---|---|---|
| JP | 2011-99693  A | 5/2011 |
| JP | 2017-520773  A | 7/2017 |
| WO | 2016/009018  A1 | 1/2016 |

OTHER PUBLICATIONS

Office Action issued in corresponding European Patent Application No. 23169187.4, dated Jul. 30, 2025.

* cited by examiner

Mean thickness difference
(difference between mean thicknesses of the peripheral and
central parts in the reagent layer)
($\mu$m)

Mean thickness difference
(difference between mean thicknesses of the peripheral
and central parts in the reagent layer)
($\mu$m)

BIOSENSOR

BACKGROUND

Technical Field

The present disclosure relates to a biosensor and a measuring method using the same.

Background Art

A biosensor is a molecular measuring device using a molecule recognition element of a detection unit in which a biological material, such as an enzyme, is arranged and a transducer (signal conversion device), such as electrodes. The biosensor is used for measuring various biological substances to be analyzed, such as glucose in a living body.

The biosensor generally includes electrodes and a reagent layer mounted on the electrodes. As a method of forming the reagent layer, an exemplary method is a method of applying a reagent liquid containing an oxidoreductase, an electron transfer substance, and the like over the electrodes and drying the reagent liquid. Exemplary methods for applying a reagent liquid include the following: the dipping method, the dispenser method, screen process printing, offset printing, and ink-jet printing (JP-A-2011-99693, JP-A-H6 (1994)-3317, and JP-A-2017-520773).

SUMMARY

In the measurement of a variety of biological substances, such as glucose, using a biosensor, measurement with a higher accuracy (reproducibility) is required. The present disclosure provides a biosensor that is capable of performing measurement with a high reproducibility and a measuring method using the same.

The present disclosure, as one aspect, relates to a biosensor that comprises a base material; a conductive part including two or more electrodes provided on a surface of the base material; and a reagent layer provided on at least a part of the conductive part; wherein the mean thickness of the reagent layer is 5 μm to 10 μm, and a mean thickness difference in the reagent layer calculated based on the following formula, that is a difference between a mean thickness of a peripheral part and a mean thickness of a central part in the reagent layer, is −6 μm to +5 μm.

$$[\text{mean thickness difference}]=[\text{mean thickness of peripheral part}]-[\text{mean thickness of central part}]$$

The present disclosure relates to, as another aspect, a method of electrochemically measuring a measurement object in a sample, comprising bringing a sample into contact with a reagent layer of the biosensor of the present disclosure; applying a voltage across electrodes of the biosensor; and measuring an electric signal generated by the application of the voltage.

With the present disclosure, a biosensor that is capable of performing measurement with a high reproducibility and a measuring method using the same can be provided.

DETAILED DESCRIPTION

Figure 1:
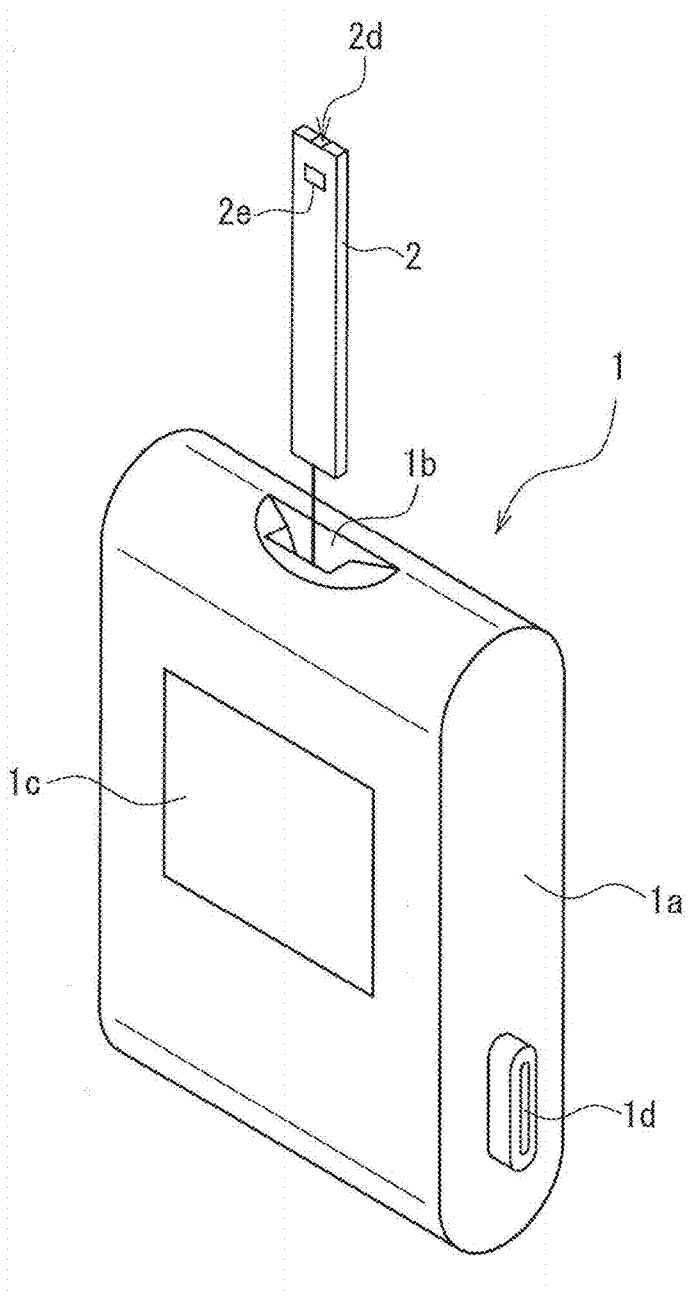
FIG. 1 is a perspective view illustrating an appearance of a biosensor in one embodiment of the present disclosure and a measurement device in which the biosensor is used.

The present inventors, in the course of earnest research from the viewpoint of providing a biosensor with improved reproducibility, found that a biosensor including a reagent layer that has the following characteristics can realize a high reproducibility: having a mean thickness of 5 μm to 10 μm; and having a mean thickness difference of −6 μm to +5 μm, that is a difference between a mean thickness of a peripheral part and a mean thickness of a central part in the reagent layer The mean thickness difference is calculated by a formula shown below:

$$[\text{mean thickness difference}]=[\text{mean thickness of peripheral part}]-[\text{mean thickness of central part}].$$

When the reagent layer has a mean thickness in the above-described range and a difference between mean thicknesses of the peripheral and central parts in the above-described range, the dissolution of a reagent occurring when a sample is supplied to the reagent layer becomes substantially uniform, which makes it possible to suppress irregularities in the reagent dissolution. Consequently, when measurement errors that can occur between biosensors (deviations of measurement results occurring between different biosensors when the known concentration of a component is measured) are reduced, the reproducibility is enhanced, according to estimation. The present disclosure, however, is not limited to this mechanism.

In addition, the present inventors found that irregularities in the concentration or amount of a reagent in a reagent layer cause irregularities in the dissolution of a reagent in the reagent layer and then lead to the deterioration of the reproducibility. In other words, the reagent layer is generally formed by applying a reagent liquid containing components, such as an oxidoreductase, an electron transfer substance, and the like and drying the reagent liquid. When a reagent liquid is applied, precipitation occurs in peripheral parts of the reagent layer due to a concentration gradient that occurs in the process of drying, growing from crystals in the peripheral parts. Differences in the timing of precipitation of the components, occurring upon the formation of the reagent layer (particularly during drying), cause irregularities in the concentrations or amounts of the components, such as an oxidoreductase in the reagent layer. Another method of forming a reagent layer by dispensing a single drop pf reagent liquid only is also known. In this case, however, the amount of the reagent is greater in the peripheral part, while the amount of the reagent is smaller in the center part, which causes irregularities in the concentrations or amounts of the components, such as an oxidoreductase in the reagent layer.

JP-A-2011-99693 discloses a method of forming a reagent layer by spraying a reagent so that droplets thereof are separated from one another, in order to avoid the occurrence of deviation of the amount of an enzyme caused by union of droplets. In the method disclosed in JP-A-2011-99693, however, when the method is used for a biosensor in which a sufficient amount of a reagent has to be mounted within a limited range, there is the problem that a sufficient amount of a reagent cannot be mounted thereon.

The present inventors, from the viewpoint of reducing such occurrence of these irregularities, attempted a new method of forming a reagent layer. First, a reagent liquid containing reagent components, such as an oxidoreductase and an electron transfer substance, are ejected at predetermined pitches. Droplets of the reagent liquid are ejected at a predetermined distance apart so that adjacent liquid droplets do not substantially merge with each other on a conductive part, and the liquid droplets are dried to form a droplet dots pattern. Then, the liquid droplets of the reagent liquid are repeatedly ejected on the dried droplet dots in the same manner as above, so that the reagent liquids are stacked and integrated, thereby forming a reagent layer. In this way, by ejecting a reagent at predetermined pitches to arrange droplets in a dotted pattern, then further stacking the reagents and integrating them, irregularities occurring during drying in the formation of a reagent layer, irregularities in the concentration and amount of the reagent components in the reagent layer, and the like, can be reduced. In addition, by arranging a reagent in a dotted pattern and then further stacking the reagent, a sufficient amount of the reagent can be mounted on a biosensor.

[Biosensor]

The present disclosure, as one aspect, relates to a biosensor that comprises a base material, a conductive part including two or more electrodes formed on a surface of the base material, and a reagent layer mounted on at least a part of the conductive part. The biosensor of the present disclosure has the following characteristics: the reagent layer has a mean thickness of 5 μm to 10 μm; and a mean thickness difference of −6 μm to +5 μm, that is a difference between a mean thickness of a peripheral part in the reagent layer and a mean thickness of a central part in the reagent layer. The mean thickness difference is calculated based on the following formula:

$$[\text{mean thickness difference}]=[\text{mean thickness of peripheral part}]-[\text{mean thickness of central part}].$$

With the biosensor of the present disclosure, in one or a plurality of embodiments, the measurement with a high reproducibility can be performed. With the biosensor of the present disclosure, in one or a plurality of embodiments, lot-to-lot differences and within-lot differences can be reduced, which makes it possible to output a correct response-measured value, thereby providing an accurate value.

Figure 4:
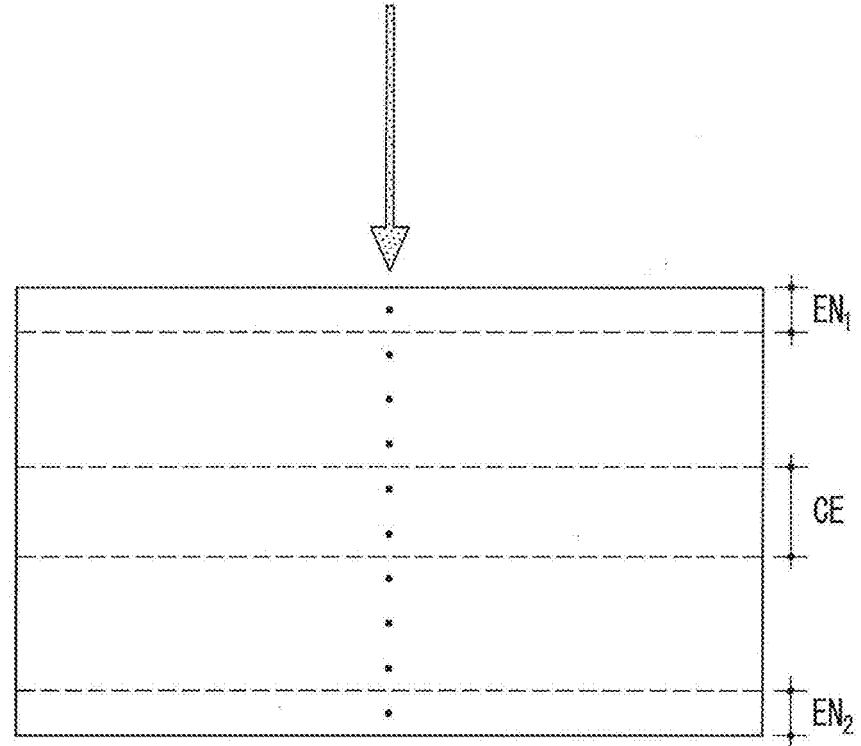
FIG. 4 is a schematic diagram for explaining measurement of the thickness of the reagent layer in the example.

The reagent layer has a mean thickness of 5 μm to 10 μm, the mean thickness of the reagent layer is above 5 μm, preferably 6 μm or more, 6.5 μm or more, or 7 μm or more, from the viewpoint of obtaining a higher reproducibility. The mean thickness of the reagent layer is 9.5 μm or less, preferably 9 μm or less, or 8.5 μm or less, from the same viewpoint. The mean thickness of the reagent layer can be measured and calculated by the method described in the Example. The measurement of the thickness of the reagent layer can be performed by, for example, measuring the thickness thereof along the center line directed along the transverse direction of the reagent layer (the position indicated by the arrow in FIG. 4), as described in the Example. FIG. 4 is a schematic diagram for explaining a method of measuring a mean thickness of the reagent layer, in which only the reagent layer is focused and shown. Incidentally, the reagent layer in the present disclosure refers to a layer of a reagent mounted in an area that is substantially involved in the measurement of an analysis object. Examples of the area that is substantially involved in the measurement of an analysis object include the inside of a flow channel in which a sample flows, in one or a plurality of embodiments.

The difference between a mean thickness of a peripheral part and a mean thickness of a central part in the reagent layer (also referred to as a "difference between mean thicknesses of the peripheral and central parts") is −6 μm to +5 μm. The difference between mean thicknesses of the peripheral and central parts is preferably −5 μm to +5 μm, −4 μm to +4 μm, −3 μm to +3 μm, −2 μm to +2 μm, or −1 μm to +1 μm, from the viewpoint of obtaining a higher reproducibility. From the same viewpoint, the difference between mean thicknesses of the peripheral and central parts is preferably −3.5 μm to +2.5 μm, −3 μm to +2 μm, or −3 μm to +1.5 μm. The difference between a mean thickness of a peripheral part and a mean thickness of a central part in the reagent layer can be calculated by the method described in the Example.

The mean thickness of the peripheral part and the mean thickness of the central part in the reagent layer can be calculated using thicknesses measured in the same method as that used for the mean thickness of the reagent layer, as in the method described in the Example.

[Shape of Reagent Layer: Prismatic Column (Rectangular Parallelepiped)]

When the reagent layer has a shape of a prismatic column (rectangular parallelepiped) or another similar shape, the mean thickness of the central part in the reagent layer may also be assumed to be a mean value of thicknesses in a range with a width of 0.1 mm on each side in a transverse direction from a point of intersection of a transverse-direction center line and a longitudinal-direction center line of the reagent layer (a range with a width of 0.2 mm in total, for example, a range CE in FIG. 4). In a case where, in a biosensor in which a flow channel through which a sample flows is formed on a base material, the reagent layer is mounted in the flow channel, the transverse direction of the reagent layer is a direction of a flow channel in which the sample flows, and the longitudinal direction of the reagent layer is a width direction of the biosensor that is orthogonal to the flow channel direction (for example, in the aspect illustrated in FIG. 2), the mean thickness of the central part in the reagent layer can be paraphrased as a mean value of thicknesses in a range with a width of 0.1 mm on each of the upstream side and the downstream side from the point of intersection of the transverse-direction center line and the longitudinal-direction center line of the reagent layer (a range with a width of 0.2 mm in total).

When the reagent layer has a shape of a prismatic column (rectangular parallelepiped), the mean thickness of the peripheral part in the reagent layer refers to a mean value of thicknesses in a range with a width of 0.1 mm from each end of the reagent layer in the transverse direction (for example, ranges EN1 and EN2 in FIG. 4).

[Shape of Reagent Layer: Circular Column]

When the reagent layer has a shape of a circular column or another similar shape, the mean thickness of the central part in the reagent layer refers to a mean value of thicknesses in a range with a width of a radius of 0.1 mm from the center of the reagent layer in the longitudinal direction of the biosensor. The mean thickness of the peripheral part refers to a mean value of thicknesses in a range with a width of 0.1 mm from the circumferential part, which is a mean value of thicknesses in a range with a width of 0.1 mm from each end (circumferential part) of the reagent layer (width of 0.1 mm×2) in the center line of the reagent layer parallel to the longitudinal direction of the biosensor.

The respective mean thickness of the peripheral part and the mean thickness of the central part of the reagent layer can be measured and calculated by the method described in the Example.

In one or a plurality of embodiments, examples of the shape of the reagent layer as viewed from above the top surface include a circular shape, an elliptical shape, and a polygonal shape. In one or a plurality of embodiments, examples of the polygonal shape include a triangle, a quadrangle, a rectangle, a pentagon, a hexagon, a heptagon, and an octagon. In one or a plurality of embodiments, the reagent layer can be referred to as a columnal structure. In one or a plurality of embodiments, the reagent layer may be in a prismatic column shape, a circular column shape, or an elliptical column shape. In one or a plurality of embodiments, the reagent layer is in a rectangular column shape, and preferably in an approximate rectangular parallelepiped shape. In one or a plurality of embodiments, when the reagent layer is in an approximate rectangular parallelepiped shape, the reagent layer is arranged on a base material in such a manner that the longitudinal direction of the reagent layer intersects at right angles with the longitudinal direction of the biosensor.

In one or a plurality of embodiments, the reagent layer may be formed by stacking a reagent containing an oxidoreductase and an electron transfer substance on a base material on which a conductive part is formed, using the dot printing of the reagent liquid. From the viewpoint of obtaining a higher reproducibility, in one or a plurality of embodiments, the dot printing for forming the second and subsequent layers is preferably performed after the droplet of the reagent liquid arranged in the previous cycle of the dot printing is dried.

The size of the reagent layer may be appropriately determined according to the shapes of the base material, the flow channel, the conductive part, and the like. When the base material is in a rectangular shape having a width of 7 mm and a length of 30 mm, the flow channel is in a rectangular shape having a width of 1.8 mm and a length of 4 mm, and a part of a working electrode of the conductive part exposed in the flow channel is in a rectangular shape having a width of 1.8 mm and a length of 0.8 mm, the reagent layer has a width (a length in the widthwise direction of the biosensor) of 1.5 mm or more, 2 mm or more, 2.5 mm or more, or 3 mm or more, in one or a plurality of embodiments. The width of the reagent layer (the length in the widthwise direction of the biosensor) is 5 mm or less, 4.5 mm or less, or 4 mm or less, in one or a plurality of embodiments. The reagent layer has a length (a length in the longitudinal direction of the biosensor) of 0.5 mm or more, 0.6 mm or more, 0.8 mm or more, or 0.9 mm or more in one or a plurality of embodiments. The length of the reagent layer (the length in the longitudinal direction of the biosensor) is 2 mm or less, 1.6 mm or less, or 1.4 mm or less, in one or a plurality of embodiments.

In one or a plurality of embodiments, the reagent layer has a bottom surface having a size (transverse direction×longitudinal direction) of 0.5 mm×1.5 mm to 2 mm×5 mm, in one or a plurality of embodiments. In the present disclosure, the transverse direction of the reagent layer may be the longitudinal direction of the biosensor, in one or a plurality of embodiments. The longitudinal direction of the reagent layer may be the widthwise direction of the biosensor, in one or a plurality of embodiments.

In one or a plurality of embodiments, the reagent layer in the biosensor of the present disclosure contains an oxidoreductase and an electron transfer substance.

[Oxidoreductase]

Examples of the oxidoreductase, in one or a plurality of embodiments, include glucose dehydrogenase (GDH), glucose oxidase (GOD), cholesterol oxidase, quinohaemoprotein ethanol dehydrogenase (QHEDH (PQQ Ethanol dh)), sorbitol dehydrogenase, D-fructose dehydrogenase, D-glucoside-3-dehydrogenase, cellobiose dehydrogenase, lactate oxidase (LOD), lactate dehydrogenase (LDH), and urinate dehydrogenase.

The oxidoreductase, in one or a plurality of embodiments, may include flavin adenine dinucleotide (FAD), pyrroloquinoline quinone (PQQ), nicotinamide adenine dinucleotide (NAD), or nicotinamide adenine dinucleotide phosphate (NADP), as a co-enzyme (also referred to as a catalyst sub-unit, or a catalyst domain). In one or a plurality of embodiments, examples of the oxidoreductase containing a co-enzyme include FAD-GDH, PQQ-GDH, NAD-GDH, and NADP-GDH.

Examples of the oxidoreductase, in one or a plurality of embodiments, include *Aspergillus oryzae*-type FAD-GDH (flavin adenine dinucleotide-dependent glucose dehydrogenase, or flavin adenine dinucleotide-linked glucose dehydrogenase). As the *Aspergillus oryzae*-type FAD-GDH, in one or a plurality of embodiments, those disclosed in JP-A-2013-083634 can be used. The contents of the foregoing document are incorporated herein by reference as a part of the present disclosure.

In one or a plurality of embodiments, the amount of the oxidoreductase in the reagent layer is 1000 KU/cm$^3$ or less, preferably 500 KU/cm$^3$ or less, and more preferably 300 KU/cm$^3$ or less. The lower limit of the amount of the oxidoreductase in the reagent layer is not particularly limited, and is 1 KU/cm$^3$ or more, in one or a plurality of embodiments. In one or a plurality of embodiments, the amount of the oxidoreductase in the reagent layer is 200 KU/cm$^3$ to 300 KU/cm$^3$, preferably 200 KU/cm$^3$ to 280 KU/cm$^3$, and more preferably 210 KU/cm$^3$ to 260 KU/cm$^3$. In the present disclosure, "U" is a unit of an enzyme activity and refers to an amount of an enzyme that reacts with 1 μmol of a substrate during 1 minute under optimum conditions. In the present disclosure, "KU" means a kilo unit (kilo U).

[Electron Transfer Substance]

In one or a plurality of embodiments, examples of the electron transfer substance include ruthenium compounds, 1-Methoxy-PES (1-Methoxy-5-ethylphenazinium ethylsulfate, 1-mPES), 1-Methoxy-PMS (1-Methoxy-5-methylphenazinium methylsulfate, 1-mPMS), phenylenediamine compounds, quinone compounds, ferricyanide compounds, Coenzyme Q0 (2,3-dimethoxy-5-methyl-p-benzoquinone), AZURE A Chloride (3-amino-7-(dimethylamino)phenothiazin-5-ium chloride), Phenosafranin (3,7-diamino-5-phenylphenanzinium chloride), 6-aminoquinoxaline, and tetrathiafulvalene.

As the ruthenium compound, in one or a plurality of embodiments, a ruthenium compound that is present in a reaction system as an oxide-type ruthenium complex and functions as an electron transfer substance can be used. The type of a ligand of the ruthenium complex is not limited particularly. In one or a plurality of embodiments, examples of the ruthenium compound include an oxide-type ruthenium complex expressed by the following chemical formula:

$$[Ru(NH_3)_5X]^{n+}.$$

X is, for example, $NH_3$, a halogen ion, CN, pyridine, nicotinamide, or $H_2O$, among which $NH_3$ or a halogen ion is preferable. In one or a plurality of embodiments, examples of the halogen ion include $Cl^-$, $F^-$, $Br^-$, and I. "n+" in the chemical formula represents a valence of oxide-type ruthenium (III) complex determined by the type of X. As the ruthenium complex, in one or a plurality of embodiments, those disclosed in JP-A-2018-013400 can be used. The contents of the foregoing document are incorporated herein by reference as a part of the present disclosure. In one or a plurality of embodiments, examples of the ruthenium compound include ruthenium hexamines such as $[Ru(NH_3)_6]^{2+}$ and $[Ru(NH_3)_6]^{3+}$. In one or a plurality of embodiments, examples of the ruthenium compound include $[Ru(NH_3)_6]$ $Cl_3$.

In one or a plurality of embodiments, examples of the phenylenediamine compound include N,N-Dimethyl-1,4-phenylenediamine, and N,N,N',N'-tetramethyl-1,4-phenylenediaminedihydrochloride.

In one or a plurality of embodiments, examples of the quinone compound include 1,4-Naphthoquinone, 2-Methyl-1,4-Naphthoquinone(VK3), 9,10-Phenanthrenequinone, 1,2-Naphthoquinone, p-Xyloquinone, Methylbenzoquinone, 2,6-Dimethylbenzoquinone, Sodium1,2-Naphthoquinone-4-sulfonate, 1,4-Anthraquinone, Tetramethylbenzoquinone, and Thymoquinone.

In one or a plurality of embodiments, examples of the ferricyanide compound include calcium ferricyanide.

In one or a plurality of embodiments, the amount of the electron transfer substance in the reagent layer is 0.1 mmol/$cm^3$ or more, preferably 0.5 mmol/$cm^3$ or more, or more preferably 1 mmol/$cm^3$. The upper limit of the amount of the electron transfer substance in the reagent layer is not particularly limited, and is 50 mmol/$cm^3$ or less, or 10 mmol/$cm^3$ or less, in one or a plurality of embodiments.

The reagent layer may contain components other than the oxidoreductase and the electron transfer substance. Examples of the other components include a buffer, an amino acid, a surfactant, a binder and, an antifoam agent, in one or a plurality of embodiments. Optionally, the reagent layer may consist of only the two components oxidoreductase and electron transfer substance.

In one or a plurality of embodiments, examples of the buffer include a phosphate buffer, an amine-based buffer, and a buffer having a carboxyl group. In one or a plurality of embodiments, examples of the amine-based buffer include Tris (tris(hydroxymethyl)aminomethane), ACES (N-(2-Acetamido)-2-aminoethanesulfonic acid), CHES (N-Cyclohexyl-2-aminoethanesulfonic acid), CAPSO (3-(Cyclohexylamino)-2-hydroxy-1-propanesulfonic acid), TAPS (N-Tris(hydroxymethyl)methyl-3-aminopropanesulfonic acid), CAPS (N-Cyclohexyl-3-aminopropanesulfonic acid), Bis-Tris (Bis(2-hydroxyethyl)iminotris(hydroxymethyl)methane), TAPSO (2-Hydroxy-N-tris(hydroxymethyl)methyl-3-aminopropanesulfonic acid), TES (N-Tris(hydroxymethyl)methyl-2-aminoethanesulfonic acid), Tricine (N-[Tris(hydroxymethyl)methyl]glycine), and ADA (N-(2-Acetamido)iminodiacetic acid). In one or a plurality of embodiments, examples of the buffer having a carboxyl group include a citrate buffer, a phosphate citrate buffer, an acetic acid-sodium acetate buffer, a malic acid-sodium acetate buffer, a malonic acid-sodium acetate buffer, and a succinic acid-sodium acetate buffer. As the buffer, one type may be used alone, or two or more types may be used in combination. In one or a plurality of embodiments, the pH of the buffer is 6.8 to 7.5, and preferably 6.9 to 7.0.

In one or a plurality of embodiments, examples of the amino acid include glycine, serine, lysin, and histidine.

In one or a plurality of embodiments, examples of the surfactant include tritonX-100 ((p-tert-octylphenoxy)polyethoxyethanol), Tween20 (polyoxyethylene sorbitan monolaurate), sodium dodecyl sulfate, perfluorooctanesulfonic acid, sodium stearate, alkylaminocarboxylic acid (or a salt of the same), carboxybetaine, sulfobetaine, and phosphobetaine. As the surfactant, one type may be used alone, or two or more types may be used in combination.

In one or a plurality of embodiments, examples of the binder include a resin binder and a layered inorganic compound. In one or a plurality of embodiments, examples of the resin binder include a butyral resin binder, and a polyester resin compound binder. As the layered inorganic compound, the layered inorganic compounds disclosed in WO2005/043146 can be used. In one or a plurality of embodiments, examples of the layered inorganic compound include a swelling clay mineral having an ion exchange capacity. In one or a plurality of embodiments, examples of the layered inorganic compound include bentonite, smectite, vermiculite, and synthetic fluoromica. As the binder, one type may be used alone, or two or more types may be used in combination.

[Base Material]

In one or a plurality of embodiments, examples of the base material include an insulating base material (insulating substrate) in a sheet form. In one or a plurality of embodiments, examples of the material for the insulating substrate include thermoplastic resin, thermosetting resin, glass, ceramic, and paper. In one or a plurality of embodiments, examples of the thermoplastic resin include polyether-imide (PEI), polyethylene terephthalate (PET), and polyethylene (PE). In one or a plurality of embodiments, examples of the thermosetting resin include polyimide resin and epoxy resin.

[Conductive Part]

The conductive part includes two or more electrodes and is formed on a surface of the base material. The conductive part is an electrically conductive part. In one or a plurality of embodiments, the electrodes may be an electrode pair that includes a working electrode and a counter-electrode, or may be a three-electrode system that includes a working electrode, a counter-electrode, and a reference electrode. In one or a plurality of embodiments, the conductive part may further include a detection electrode. In a case where the conductive part includes at least an electrode pair including a working electrode and a counter-electrode, the reagent layer is preferably mounted on at least the working electrode, in one or a plurality of embodiments.

As the material for the electrodes, in one or a plurality of embodiments, conductive materials can be used. In one or a plurality of embodiments, examples of the conductive material include metal materials and carbon materials. In one or a plurality of embodiments, examples of the metal material include gold (Au), platinum (Pt), silver (Ag), ruthenium (Ru), palladium (Pd), and nickel (Ni) alloys. In one or a plurality of embodiments, examples of the nickel alloy include nickel-vanadium alloy, nickel-tungsten alloy, and nickel-ruthenium alloy. In one or a plurality of embodiments, examples of the carbon material include graphite, carbon nanotube, graphene, and mesoporous carbon.

In one or a plurality of embodiments, examples of the electrode include a thin film electrode created by forming a film of the above-described material, such as the metal material on a base material. In one or a plurality of embodiments, examples of the film-forming method include screen printing, physical vapor deposition (PVD, for example, sputtering), and chemical vapor deposition (CVD).

Examples of the sample in the biosensor of the present disclosure include a biological specimen, in one or a plurality of embodiments. Examples of the biological specimen include blood, urine, and specimens derived from these, cell-extract specimens, and cell-culture solutions, in one or a plurality of embodiments.

Examples of the measurement object in the biosensor of the present disclosure in one or a plurality of embodiments, include glucose, cholesterol, ethanol, sorbitol, fructose, cellobiose, lactic acid, and urea.

[Biosensor Manufacturing Method]

The biosensor of the present disclosure, in one or a plurality of embodiments, can be manufactured by preparing a base material in which a conductive part including two or more electrodes is formed and stacking a reagent on the conductive part by dot printing of a reagent liquid to form a reagent layer. In one or a plurality of embodiments, the reagent layer is preferably formed so as to be mounted on a part of at least one (working electrode) of the two or more electrodes.

The present disclosure relates to, as another aspect, a method of manufacturing a biosensor of the present disclosure. The biosensor manufacturing method of the present disclosure includes forming a reagent layer by stacking a reagent on a conductive part formed on a surface of a base material, by dot printing a reagent liquid on the conductive part, and the step of forming a reagent layer includes stacking the reagent by dot printing the reagent liquid in such a manner that the formed reagent layer has a mean thickness in the above-described range, and a mean thickness difference that is a difference between a mean thickness of a peripheral part in the reagent layer and a mean thickness of a central part in the reagent layer is in the above-described range.

In the manufacturing method of the present disclosure, the electrodes, the base material, the reagent, and the mean thicknesses are identical to those of the biosensor of the present disclosure described above.

[Measuring Method]

The present disclosure relates to, as another aspect, a method of electrochemically measuring a measurement object in a sample using a biosensor of the present disclosure, comprising bringing a sample into contact with a reagent layer of the biosensor; applying a voltage across electrodes of the biosensor; and measuring an electric signal generated by the application of the voltage.

In the present disclosure, "electrochemically measuring" refers to measuring by applying electrochemical measurement techniques, and examples of the same include the amperometric method, the potential difference measuring method, and the coulometric analysis method, in one or a plurality of embodiments. In one or a plurality of embodiments, examples of the amperometric method includes the method of measuring a value of electric current generated when a reduced electron transfer substance is oxidized by application of a voltage.

In one or a plurality of embodiments, the voltage to be applied is, although not particularly limited to, 10 mV or more, or 50 mV or more, and preferably 100 mV or more. In addition, in one or a plurality of embodiments, the voltage to be applied is, although not particularly limited to, 1000 mV or less, 700 mV or less, preferably 600 mV or less, 500 mV or less, 400 mV or less, or 300 mV or less.

Embodiment

An exemplary biosensor manufacturing method of the present disclosure is described with reference to the drawings. The configuration of the embodiment described below is an example, and the present disclosure is not limited to the configuration of the embodiment. The present embodiment is described with reference to an exemplary case in which a reagent layer is formed by dot printing using an ink-jet printer.

Figure 2:
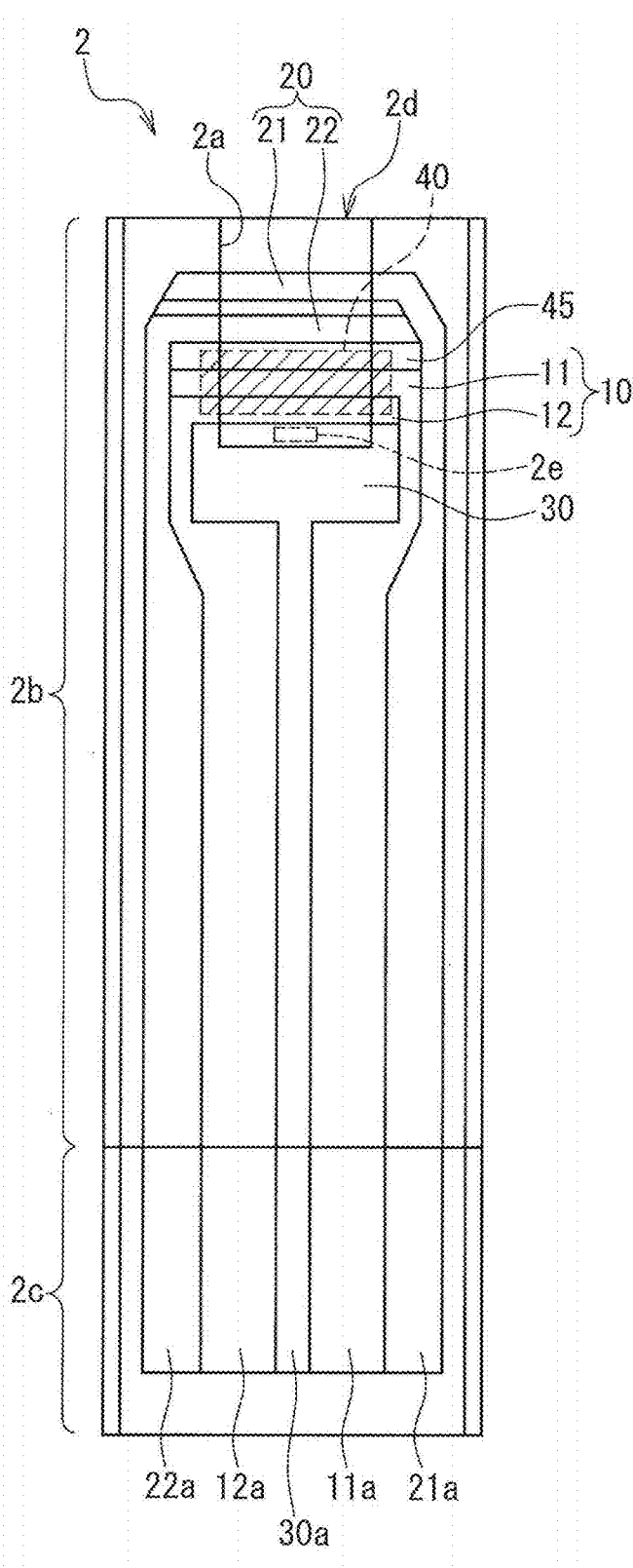
FIG. 2 is a schematic diagram for illustrating a schematic configuration of a biosensor in one embodiment of the present disclosure.

First, as illustrated in FIG. 2, an electrode system (conductive part) including a first electrode pair 10, a second electrode pair 20, and a blood-detection electrode 30 is formed on a base material by sputtering. The first electrode pair 10 includes a first working electrode 11 and a first counter-electrode 12, the second electrode pair 20 includes a second working electrode 21 and a second counter-electrode 22, and this electrode system is therefore composed of five electrodes.

Next, a reagent layer 40 is formed on the first electrode pair 10 (the first working electrode 11 and the first counter-electrode 12).

The reagent layer 40 can be formed by dot printing (dropping and drying) a reagent liquid at predetermined pitches on a surface of the base material on which the reagent is to be mounted (hereinafter referred to as a surface for reagent mounting), using an ink-jet printer. The dot printing at predetermined pitches can be performed, for example, in the following manner. First, a two-dimensional lattice is provided virtually on the surface for reagent mounting, when the surface for reagent mounting of the base material is viewed in a plan view. In the lattice, dots are arrayed at equal pitches on a plurality of rows that are arrayed at equal pitches, and the dots of each row are shifted by half of the pitch from the dots of the adjacent row. The lattice includes an orthorhombic lattice, a rhombic lattice, a centered rectangular lattice, or an isosceles triangle lattice, for example. Next, the dot printing of each dot on an odd-numbered row and the dot printing of each dot on an even-numbered row are repeatedly performed alternately.

One embodiment of the formation of the reagent layer 40 is described. First, for the first layer, for example, the reagent liquid is dropped on each dot on the above-described odd-numbered rows and is dried, whereby the reagent is arranged in a lattice pattern. Next, for the second layer, for example, the reagent liquid is dropped on each dot on the above-described even-numbered rows and is dried, whereby the reagent is arranged in a lattice pattern, at different positions from the positions of the first layer. Then, for the third layer, for example, the reagent liquid is dropped on each dot on the above-described odd-numbered rows and is dried, whereby the reagent is arranged in a lattice pattern, at approximately the same positions as the positions of the first layer. The dropping of the reagent liquid and then drying is repeated. As a result, for example, the reagent liquid dropped in the formation of the second layer dissolves a part of the reagent of the first layer and becomes dried, whereby the reagent of the second layer is arranged. This process of dropping of the reagent liquid, partial dissolution, and drying is repeated in the third layer, the fourth layer, and the subsequent layers, whereby a reagent layer that a difference between a mean thickness of a peripheral part in the reagent layer and a mean thickness of a central part in the reagent layer falls within a predetermined range can be formed, whereby the reproducibility can be further enhanced.

On the base material in which the reagent layer 40 is formed, a spacer (not shown) having a rectangular cutout part, as a cover area 2b, and a cover (not shown) made of a synthetic resin, in which an air hole 2e is formed, are arranged in this order, whereby a biosensor can be manufactured.

In one or a plurality of embodiments, the biosensor of the present disclosure can be used in a measuring device, such as a blood glucose meter. An exemplary measuring device is shown in FIG. 1. The measuring device 1 shown in FIG. 1 can be used as a blood glucose meter, such as a portable-type blood glucose measuring device, a self-monitoring blood glucose meter, or the like.

The measuring device 1 includes a main body 1a, as shown in FIG. 1. The main body 1a is provided with an insertion port 1b through which a biosensor 2 in a rectangular strip shape is inserted, a display screen 1c that displays measurement data, and a connector 1d for data communication with external equipment.

As illustrated in FIG. 1, a sample supply port 2d and an air hole 2e are formed in the biosensor 2. The sample supply port 2d communicates with a flow channel (2a in FIG. 2) to be described below, and the air hole 2e is provided for discharging air in the flow channel (2a in FIG. 2), the air having come together with a sample supplied from the sample supply port 2d into the flow channel (2a in FIG. 2).

FIG. 2 illustrates a schematic diagram of one embodiment of a biosensor of the present disclosure. In FIG. 2, the upper side is the upstream side and the lower side is the downstream side.

The biosensor 2 includes a base material, a conductive part formed on the base material, using a metal or carbon material, and a reagent layer 40 formed on the conductive part. On the conductive part and the reagent layer 40, a spacer (not shown) having a rectangular cutout part, as a cover area 2b, and further, on top of the same, a cover (not shown) made of a synthetic resin, in which an air hole 2e is formed, are laminated. By the laminating of the base material, the spacer, and the cover, a space having the sample supply port 2d, formed by the cutout part of the spacer, is formed, and this space serves as the flow channel 2a. The air hole 2e is formed in the vicinity of the downstream end of the flow channel 2a.

In the present embodiment, the base material has a width of 7 mm, a length of 30 mm, and a thickness of 250 μm. The flow channel 2a has a width of 2 mm and a length of 4 mm. The reagent layer 40 has a length (in the widthwise direction of the biosensor) of 2.7 mm and a width (in the longitudinal direction of the biosensor) of 1 mm.

In the conductive part, the five electrodes, which are the first working electrode 11 and the first counter-electrode 12 as the first electrode pair 10, the second working electrode 21 and the second counter-electrode 22 as the second electrode pair 20, and the blood-detection electrode 30, are formed in such a manner that they are exposed in the flow channel 2a, in rectangular shape, each parallel to the widthwise direction (lateral direction) of the biosensor 2. The first electrode pair 10, the second electrode pair 20, and the blood-detection electrode 30 exposed in the flow channel 2a are in contact with blood (sample) introduced therein and function as a measurement area. Adjacent ones of the electrodes are insulated from each other. In a case where the conductive part is formed with a metal material formed by physical vapor deposition, predetermined electrode patterns are drawn by laser light (trimming) so that the electrodes are insulated from one another. In a case where the conductive part is formed with a carbon material, the electrodes are formed with a predetermined distances from one another. The conductive part (electrodes) of the present embodiment is formed with a nickel vanadium alloy.

Each electrode is extended along the longitudinal direction of the biosensor 2 and is bent in the widthwise direction of the biosensor 2 on the upstream end side. The bending parts of the second working electrode 21, the second counter-electrode 22, the first working electrode 11, the first counter-electrode 12, and the blood-detection electrode 30 are positioned in parallel in the widthwise direction of the biosensor 2 in the stated order from the upstream side. Of each electrode, a portion thereof in the cover area 2b from the upstream end to the vicinity of the downstream end of the biosensor 2 is covered with the above-described cover (not shown), but a downstream end portion thereof is not covered but exposed, and this portion functions as a connector area 2c to be inserted into the insertion port 1b of the main body 1a. In this connector area 2c, a lead portion 11a of the first working electrode 11, a lead portion 12a of the first counter-electrode 12, a lead portion 21a of the second working electrode 21, a lead portion 22a of the second counter-electrode 22, and a lead portion 30a of the blood-detection electrode 30 are respective exposed contact points.

In the widthwise-direction middle part of the upstream portion of the biosensor 2, a gap is formed between each electrode and the cover (not shown). This gap is a capillary-type flow channel 2a through which blood containing a measurement object is introduced and flows, as described above. A non-conductive area 45 that is a gap between the second counter-electrode 22, which is the second electrode from the upstream side, and the first working electrode 11, which is the third electrode from the upstream side, is wider than the other gaps between the electrodes. This non-conductive area 45 is an area formed by laser light drawing rectangular patterns in the electrode layer, thereby being insulated from the other electrodes.

The reagent layer 40 is mounted on the first working electrode 11. As to the area where this reagent layer 40 is mounted, the downstream side thereof reaches the middle of the first counter-electrode 12, and the upstream side thereof reaches the middle of the non-conductive area 45, but does not reach the second counter-electrode 22. In other words, as the first working electrode 11 and the second counter-electrode 22 are separated by the non-conductive area 45, the reagent layer 40 mounted on the first working electrode 11 and the second counter-electrode 22 are prevented from coming into contact. When blood (sample) is spotted on the sample supply port 2d of the biosensor 2, the blood flows to the downstream side through the flow channel 2a by capillary force, from the second working electrode 21, the second counter-electrode 22, the first working electrode 11, the first counter-electrode 12, to the blood-detection electrode 30 in the stated order. Here, when the blood (sample) reaches the first working electrode 11, reagent components of the reagent layer 40 mounted on the first working electrode 11 are dissolved by the blood (sample).

An exemplary method of electrochemically measuring a measurement object in a sample using a biosensor 2 is described with reference to an exemplary case where the sample is whole blood and the measurement object is glucose.

First, the whole-blood sample is brought into contact with the sample supply port 2d of the biosensor 2. When the whole-blood sample is spotted on the sample supply port 2d of the biosensor 2, the blood flows to the downstream side through the flow channel 2a by capillary force, from the second working electrode 21, the second counter-electrode 22, the first working electrode 11, the first counter-electrode 12, to the blood-whole detection electrode 30 in the stated order. Here, when the whole-blood sample reaches the first working electrode 11, reagent components (oxidoreductase, electron transfer substance, etc.) contained in the reagent layer 40 mounted on the first working electrode 11 are dissolved by the whole-blood sample.

Then, when a predetermined potential is applied to the electrode pair, electrons are transferred between the electron transfer substance present in the reagent layer 40 and the first working electrode 11 positioned below the reagent layer 40, and the oxidation current flows. Based on this, glucose concentration can be measured. In one or a plurality of embodiments, the voltage to be applied is 10 mV to 1000 mV, and preferably 100 mV to 600 mV.

The above-described embodiment is described with reference to, as an example, the configuration of the biosensor and the measuring method in a case where the sample is blood (for example, whole blood), but the present invention is not limited to this, and various biological specimens other than blood, such as urine, can be measured in the same manner.

The present disclosure may relate to one or a plurality of non-limiting embodiments described below:

[1] A biosensor comprising:
    a base material;
    a conductive part including two or more electrodes provided on a surface of the base material; and
    a reagent layer provided on at least a part of the conductive part,
    wherein the mean thickness of the reagent layer is 5 μm to 10 μm, and
    a mean thickness difference in the reagent layer, that is a difference between a mean thickness of a peripheral part and a mean thickness of a central part in the reagent layer, is −6 μm to +5 μm, wherein

[mean thickness difference]=[mean thickness of peripheral part]−[mean thickness of central part].

[2] The biosensor according to [1], wherein the reagent layer contains an oxidoreductase and an electron transfer substance.
[3] The biosensor according to [1] or [2], wherein the reagent layer is formed by stacking a reagent that contains the oxidoreductase and the electron transfer substance by dot printing of the reagent liquid.
[4] The biosensor according to any one of [1] to [3], wherein the shape of the reagent layer is an approximate rectangular parallelepiped.
[5] The biosensor according to [4], wherein the size of bottom surface of the reagent layer is 0.5 mm×1.5 mm to 2 mm×5 mm.
[6] The biosensor according to any one of [1] to [5], wherein the conductive part includes at least an electrode pair including a working electrode and a counter-electrode, and
    the reagent layer is provided on at least the working electrode.
[7] The biosensor according to any one of [2] to [6], wherein the content of the oxidoreductase in the reagent layer is 200 KU to 300 KU per unit volume (cm$^3$) of the reagent layer.
[8] The biosensor according to any one of [2] to [7], wherein the content of the electron transfer substance in the reagent layer is 0.1 mmol to 50 mmol per unit volume (cm$^3$) of the reagent layer.
[9] The biosensor according to any one of [1] to [8], wherein the reagent layer further contains a surfactant.
[10] A method of electrochemically measuring a measurement object in a sample, the method including:
    bringing a sample into contact with a reagent layer of the biosensor according to any one of [1] to [9];
    applying a voltage across electrodes of the biosensor; and
    measuring an electric signal generated by the application of the voltage.

Hereinafter, although the following description describes the present disclosure in greater detail by way of examples, these are illustrative, and the present disclosure is not limited to these examples.

EXAMPLE

Example 1

A reagent layer was formed on a base material (PET, thickness 250 μm, length 30 mm×width 7 mm) on which electrodes were formed by dot printing a reagent using an ink-jet device in the following procedure. The formation of the reagent layer was performed under conditions of room temperature and a humidity of 50% or less.
<Procedure>
1. Reagent liquid was filled in a storage part of an ink-jet device, droplets of the reagent liquid (viscosity: 2 to 3 mPa·s) were ejected under the following conditions on the base material (made of PET) on which electrodes were formed, whereby liquid droplet dots of the reagent (dot-form droplets made of the reagent liquid, in a spot pattern) were formed (the first layer). The amount of the reagent liquid ejected per one droplet was set to 12 ng (10 pL). The ejection pitch of the droplet (distance between the center of the ejected droplet dot and the center of the next ejected droplet dot) was set to 70 μm, and the ejection of the droplet dots was performed in a lattice pattern. After all of the droplet dots for the first layer were formed, the droplet dots were dried (30 seconds). The dried droplet dots had a diameter of 50 to 70 μm.
2. Next, on the dried droplet dots of the first layer, liquid droplet dots of the reagent were formed by ejecting liquid droplets of the reagent and dried (the second layer). The formation of the droplet dots for the second layer was performed in such a manner that the amount of the reagent liquid ejected per one droplet was set to 23 ng (18 pL), and the center of each ejected droplet dot was positioned at an approximate center (c2 in FIG. 3) of a square having vertices at the centers (c1A, c1B, c1C, and c1D in FIG. 3) of adjacent ones of the droplet dots of the first layer. The dried droplet dots of the second layer had a diameter of 90 to 100 μm. In the formation of the droplet dots for the second layer, the ejection pitch of the droplet (distance between the centers of the ejected droplet dot and the centers of the next ejected droplet dot) was set to 70 μm, as in the first layer.
3. Next, on the dried droplet dots of the second layer, liquid droplet dots of the reagent were formed by electing liquid droplets of the reagent and dried (the third layer). The formation of the droplet dots for the third layer was performed in such a manner that the amount of the reagent liquid ejected per one droplet was set to 23 ng, and the centers of the droplet dots were positioned at approximately the same positions as the centers of the droplet dots of the first layer.

4. Next, droplet dots of the reagent for the fourth layer were formed on top of the dried droplet dots of the third layer. The formation of the droplet dots for the fourth layer was performed in the same manner as that for the second layer.

5. Next, droplet dots of the reagent for the fifth layer were formed on top of the dried droplet dots of the fourth layer. The formation of the droplet dots for the fifth layer was performed in the same manner as that for the third layer. Through these procedures, the reagent layer with the reagents stacked three-dimensionally (an approximate rectangular parallelepiped (quadrangular prism)) was obtained. The amount of FAD-dependent glucose dehydrogenase in the obtained reagent layer was 232 KU/cm$^3$, and the amount of the electron transfer substance was 3.56 mmol/cm$^3$.

<Conditions for Formation of Droplet Dots>

Figure 3:
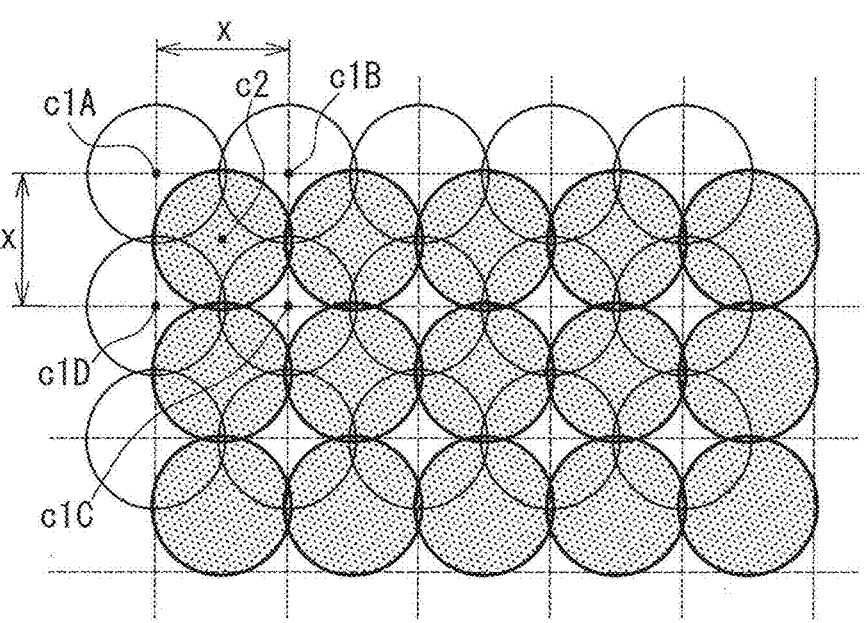
FIG. 3 is a schematic diagram for explaining a method of forming a reagent layer in an example.

Distance between the centers of adjacent dots (for example, distance (X) between c1A and c1B in FIG. 3): 70 μm Number of times of ejection: 14 times in the transverse direction×39 times in the longitudinal direction, to the reagent layer formation area (transverse: 1000 μm, longitudinal: 2700 μm, rectangular parallelepiped)

In the present example, first, when the surface for reagent mounting of the base material was viewed in a plan view, a two-dimensional lattice pattern was virtually provided thereon, and the liquid droplet dots were formed using each lattice point as a guide. The lattice points were arrayed at equal pitches on a plurality of rows that are arrayed at equal pitches, and the lattice points of each row were positioned with a shift of half of the pitch from the dots of the adjacent row. For the first layer, the liquid droplets of the reagent were dropped on the lattice points on the odd-numbered rows and were dried, whereby the droplet dots of the first layer, arrayed in a lattice pattern, were formed. For the second layer, the liquid droplets of the reagent were dropped on the lattice points on the even-numbered rows and were dried, whereby the droplet dots of the second layer were formed. For the third layer, the liquid droplets of the reagent were dropped on the lattice points on the odd-numbered rows and were dried, whereby the droplet dots of the third layer were formed. These processes were repeated. Through this procedure, the liquid droplets dropped for forming droplet dots for the second layer dissolved a part of the dried droplet dots of the first layer, and then were dried, whereby the liquid droplets were formed. In the formation of the third layer, the fourth layer, and the fifth layer, similarly the partial dissolution of the dried droplet dots and drying of the liquid droplets was repeated, whereby such a reagent layer with a difference between a mean thickness of a peripheral part and a mean thickness of a central part in the reagent layer within a predetermined range could be formed.

The composition of the reagent liquid was as follows.

<Composition of Reagent Liquid>

FAD-dependent glucose dehydrogenase (product name: Glucose Dehydrogenase "Amano"8, MW: 180,000, manufactured by Amano Enzyme Inc.): 48 KU/mL Ru complex (Ru(NH$_3$)$_6$Cl$_3$, manufactured by LT Metal Co. Ltd.): 626 mM 1-Methoxy PES (1-methoxy-5-ethylphenazinium ethylsulfate, manufactured by Dojindo Laboratories Co., Ltd.): 2.27 mM Phosphate buffer (pH 7.0): 300 mM Glycine: 2 mass %

CHAPS: 2 mass %

Antifoam agent: 0.04 mass %

[Measurement of Thickness of Reagent Layer]

The thickness of the obtained reagent layer was measured using a benchtop stylus profiling system (product name: DektakXT, manufactured by BRUKER). The measurement was performed along the center line of the reagent layer along the transverse direction of the reagent layer (the center line along the longitudinal direction of the biosensor, the center line passing the position of approximately 1,350 μm from the left end) (in the arrow direction in FIG. 4). The reagent layer has a rectangular shape when viewed from above the top surface.

<Mean Thickness>

The height (the thickness of the reagent layer) was measured in increments of 670 nm, from one end to the other end (from the upstream side to the downstream side of the biosensor) along the center line of the reagent layer (at the position of approximately 1350 μm from the left end) in the transverse direction of the reagent layer. By calculating an arithmetic mean of the measured values, the mean thickness of the reagent layer was measured.

<Difference Between Mean Thickness of Peripheral Part and Mean Thickness of Central Part in Reagent Layer>

Using the thicknesses of the reagent layer measured as described above, a mean thickness (TH$_{EN}$) of both end parts and a mean thickness (TH$_{CE}$) of the central part were calculated. The mean thickness (TH$_{EN}$) of both end parts was calculated by determining an arithmetic mean of the thicknesses of both end parts (the upstream side and the downstream side of the biosensor) (EN$_1$ and EN$_2$ in FIG. 4, each with a width of 0.1 mm). The mean thickness (TH$_{CE}$) of the central part was calculated by determining an arithmetic mean of the thicknesses in a range with a width of 0.2 mm around the point of intersection of the transverse-direction center line and the longitudinal-direction center line in the reagent layer. In other words, it is the mean value of thicknesses in a range with a width of 0.1 mm on each side from the point of intersection (on the upstream side and the downstream side) along the center line in the transverse direction of the reagent layer (CE in FIG. 4, a range with a width of 0.2 mm in total). With the mean thickness of both end parts (the mean thickness (TH$_{EN}$) of the peripheral part) and the mean thickness (TH$_{CE}$) of the central part thus obtained, the difference between mean thicknesses of the peripheral and central parts of the reagent layer was determined by the following equation.

$$[\text{Difference between mean thicknesses of the peripheral and central parts}] = (TH_{EN}) - (TH_{CE})$$

[Reproducibility Test of Glucose Current Value]

A glucose current value reproducibility test was performed using the biosensor in which the reagent layer was formed by the above-described method. The reproducibility of glucose current value was defined as a mean of glucose current values at respective sample concentrations (Cyclic Voltammetry, CV).

Figure 6:
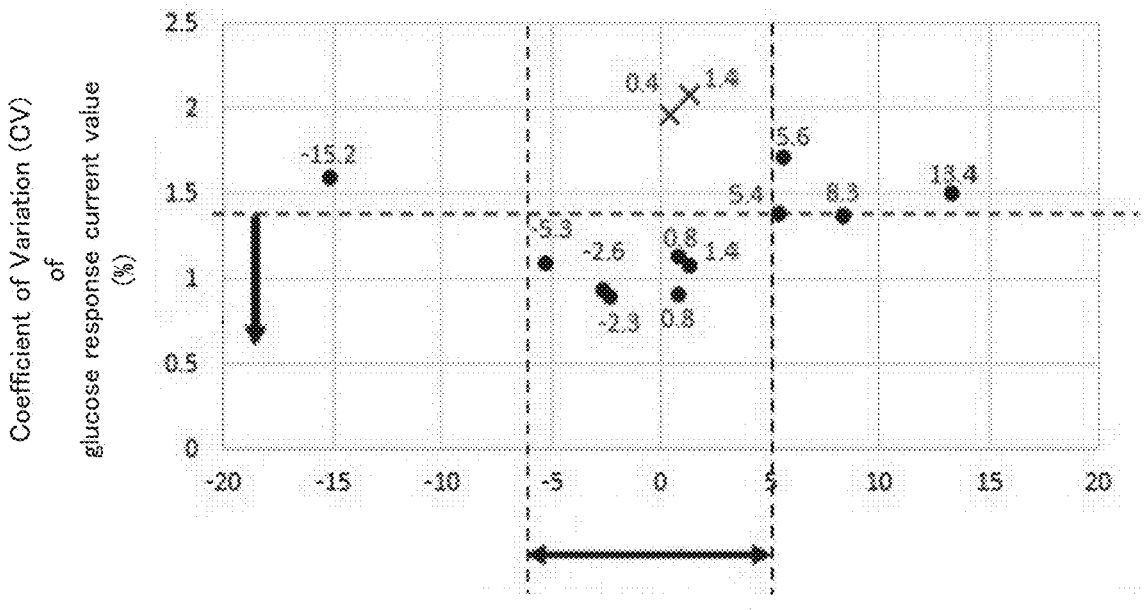
FIG. 6 illustrates exemplary results obtained in the example, which show the relationship between the coefficient of variation (CV) (%) (reproducibility of glucose response current value) and the difference between mean thicknesses of the peripheral and central parts in the reagent layer.

Using a potentiostat (manufactured by Arkray Inc.), a voltage was applied at 0.2 V, to measure current values. A coefficient of variation (CV) (%) was determined from the determined current values. The results are shown in FIG. 6.

A lower CV means high reproducibility, and a CV of less than 1.4 indicates the preferred reproducibility for the biosensor.

<Evaluation Conditions>

Used sample: Whole blood sample

Glu/Hct concentration: Glu45 mg/dl/Hct42%, Glu130 mg/dl/Hct42%, Glu330 mg/dl/Hct42%

The number of evaluations: n=10 (as the evaluations were performed at each Glu/Hct concentration, 30 evaluations in total were carried out)

Figure 5:
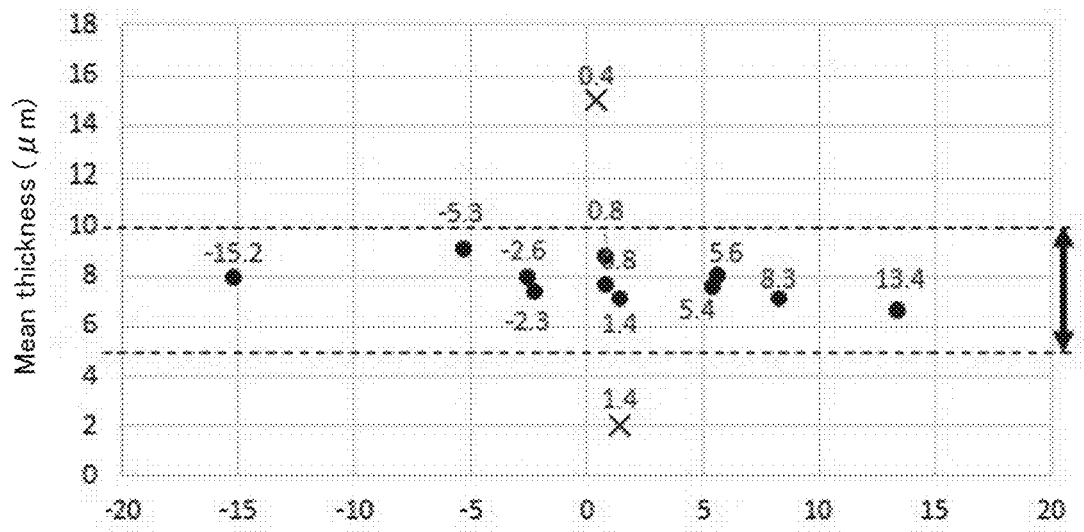
FIG. 5 illustrates exemplary results obtained in the example, which show the relationship between the mean thickness and the difference between mean thicknesses of the peripheral and central parts in the reagent layer.

FIG. 5 shows the relationship between the mean thickness and the difference between mean thicknesses of the peripheral and central parts (mean thickness difference) in the obtained reagent layer, and FIG. 6 shows the relationship between the CV (%) of glucose response current value (the reproducibility of glucose response current value) and the difference between mean thicknesses of the peripheral and central parts. The values shown in the graphs of FIGS. 5 and 6 are differences between the mean thicknesses of the peripheral and central parts (mean thickness difference) in the respective reagent layers.

In FIG. 5, data of mean thicknesses of the reagent layer in a range of 5 μm to 10 μm are plotted by marks of "black circle," and data outside the range of 5 μm to 10 μm are plotted by marks of "x." In FIG. 6, in data showing the difference between the mean thickness of the central and peripheral parts falling in a range of −6 μm to +5 μm, data of the Glu value reproducibility (%) of less than 1.4% are plotted by marks of "black circle," and data of 1.4% or more are plotted by marks of "x."

As shown in FIGS. 5 and 6, the mean thickness of the reagent layer (height of reagent) was 5 μm to 10 μm, and when the difference between mean thicknesses of the peripheral and central parts (height difference) was −6 μm to +5 μm, CV (%) was less than 1.4%, lot-to-lot differences and within lot differences were reduced, and a high reproducibility was obtained.

The disclosure may be embodied in other forms without departing from the spirit or essential characteristics thereof. The embodiments disclosed in this application are to be considered in all respects as illustrative and not limiting. The scope of the disclosure is indicated by the appended claims rather than by the foregoing description, and all changes that come within the meaning and range of equivalency of the claims are intended to be embraced therein.

What is claimed is:

1. A biosensor comprising:
a base material;
a conductive part including two or more electrodes provided on a surface of the base material; and
a reagent layer provided on at least a part of the conductive part,
wherein a mean thickness of the reagent layer is 5 μm to 10 μm, and
wherein a mean thickness difference that is a difference between a mean thickness of an upstream end and a downstream end of the reagent layer and a mean thickness of a central part in the reagent layer is −6 μm to +0.4 μm

[mean thickness difference]=[mean thickness of upstream end and downstream end of the reagent layer]−[mean thickness of central part].

2. The biosensor according to claim 1,
wherein the reagent layer contains an oxidoreductase and an electron transfer substance.

3. The biosensor according to claim 2,
wherein the reagent layer is formed by stacking a reagent that contains the oxidoreductase and the electron transfer substance by dot printing of a reagent liquid.

4. The biosensor according to claim 1,
wherein a shape of the reagent layer is an approximate rectangular parallelepiped.

5. The biosensor according to claim 4,
wherein a size of a bottom surface of the reagent layer is 0.5 mm×1.5 mm to 2 mm×5 mm.

6. The biosensor according to claim 1,
wherein the conductive part includes at least an electrode pair including a working electrode and a counter-electrode, and
wherein the reagent layer is provided on at least the working electrode.

7. The biosensor according to claim 2,
wherein an amount of the oxidoreductase in the reagent layer is 200 KU to 300 KU per unit volume ($cm^3$) of the reagent layer.

8. The biosensor according to claim 2,
wherein an amount of the electron transfer substance in the reagent layer is 0.1 mmol to 50 mmol per unit volume ($cm^3$) of the reagent layer.

9. The biosensor according to claim 1,
wherein the reagent layer further contains a surfactant.

10. A method of electrochemically measuring a measurement object in a sample, the method comprising:
bringing the sample into contact with the reagent layer of the biosensor according to claim 1;
applying a voltage across electrodes of the biosensor; and
measuring an electric signal generated by the application of the voltage.

11. The biosensor according to claim 1,
wherein the mean thickness of the reagent layer is 6 μm to 10 μm.

12. The biosensor according to claim 1,
wherein the mean thickness of the reagent layer is 7 μm to 10 μm.

13. The biosensor according to claim 1,
wherein the mean thickness of the central part in the reagent layer is −6 μm to −0.23 μm.

14. The biosensor according to claim 4,
wherein the mean thickness of the upstream end and the downstream end of the reagent layer is a mean value of thicknesses in a range with a width of 0.1 mm from each end of the reagent layer in a transverse direction.

15. The biosensor according to claim 4,
wherein the mean thickness of the central part in the reagent layer is a mean value of thicknesses in a range with a width of 0.1 mm on each of the upstream side and the downstream side from a point of intersection of a transverse-direction center line and a longitudinal-direction center line of the reagent layer.

16. The biosensor according to claim 1,
wherein Glu value reproducibility (%) is less than 1.4%.

\* \* \* \* \*